United States Patent [19]

Fortin

[11] Patent Number: 5,226,017
[45] Date of Patent: Jul. 6, 1993

[54] METHOD AND APPARATUS FOR ACQUIRING BOREHOLE SEISMIC DATA IN TWO OPPOSITE DIRECTIONS

[75] Inventor: Jean-Pierre Fortin, Paris, France

[73] Assignee: Compagnie Generale De Geophysique, Massy Cedex, France

[21] Appl. No.: 752,456

[22] PCT Filed: Dec. 19, 1990

[86] PCT No.: PCT/FR90/00928
§ 371 Date: Aug. 19, 1991
§ 102(e) Date: Aug. 19, 1991

[87] PCT Pub. No.: WO91/09328
PCT Pub. Date: Jun. 27, 1991

[30] Foreign Application Priority Data

Dec. 19, 1989 [FR] France ............................ 89 16804

[51] Int. Cl.$^5$ .............................................. G01V 1/40
[52] U.S. Cl. ....................................... 367/34; 181/104; 367/25
[58] Field of Search ............ 367/25, 26, 34, 36, 367/35, 59, 60, 61, 118, 121, 124, 126; 181/101, 102, 104

[56] References Cited

U.S. PATENT DOCUMENTS

| 3,976,969 | 8/1976 | Meuser | 367/126 |
| 4,173,748 | 11/1979 | Lewandowski | 367/123 |
| 4,207,619 | 6/1980 | Klaveness | 367/36 |
| 4,794,573 | 12/1988 | Bell et al. | 367/57 |
| 4,813,029 | 3/1989 | Erich, Jr. et al. | 181/401 |
| 4,833,658 | 5/1989 | Staron | 367/27 |
| 5,066,916 | 11/1991 | Rau | 324/338 |

Primary Examiner—Ian J. Lobo
Attorney, Agent, or Firm—Skjerven, Morrill, MacPherson, Franklin, & Friel

[57] ABSTRACT

The invention relates to a method and apparatus for acquiring borehole seismic data in two opposite directions in a borehole. Acquisition consists in emitting a pressure wave (R, R') at a point (E) in the borehole (PU), and, at a point (R) in the borehole (PU) that is offset relative to the pressure wave emission point (E), in detecting the echoes reflected and refracted by the adjacent geological formations (Ci) in such a manner as to discriminate between pressure waves reflected and refracted by the above-mentioned geological formations in a longitudinal plane of symmetry (P) of the borehole (PU). The discrimination is performed on the basis of detecting the sum and the difference of echo signals coming from opposite directions. The invention is applicable to determining horizons above and below an inclined borehole.

41 Claims, 4 Drawing Sheets

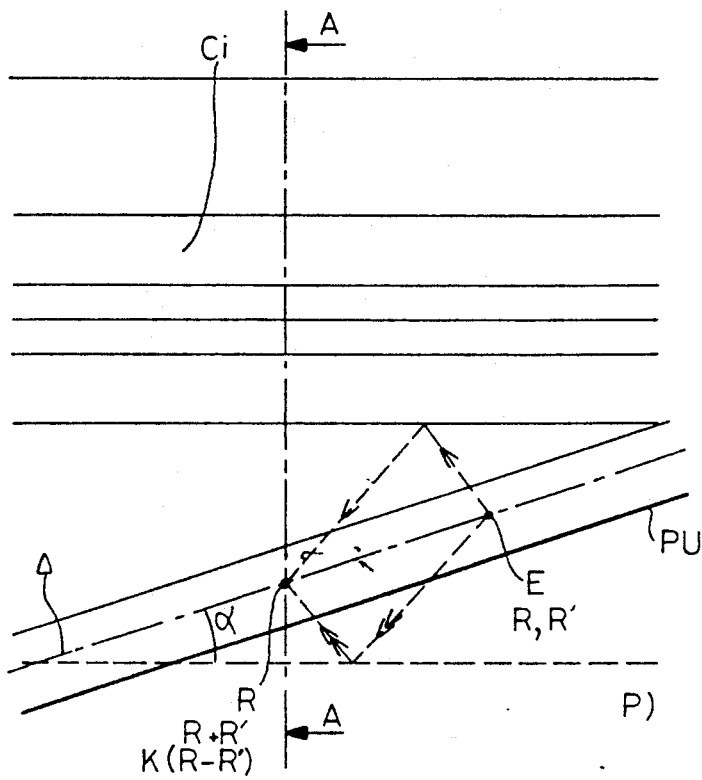
FIG_1a
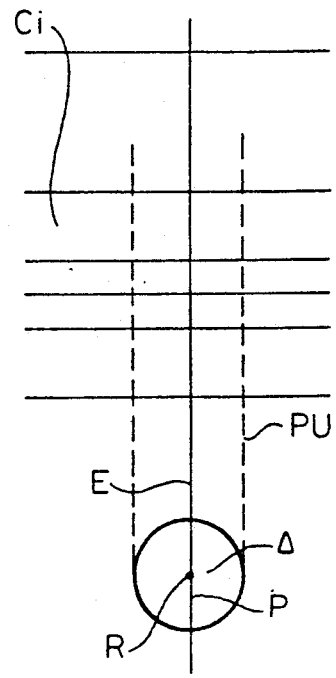
FIG_1b
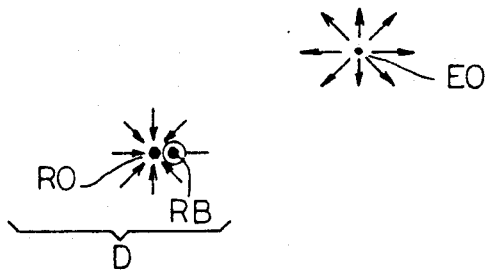
FIG_2a
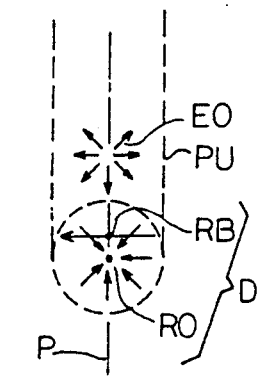
FIG_2b
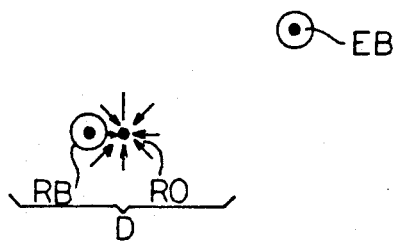
FIG_3a
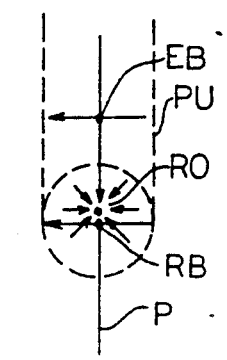
FIG_3b

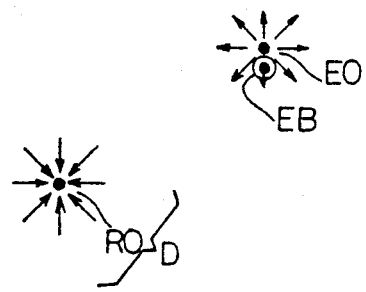
FIG_4a
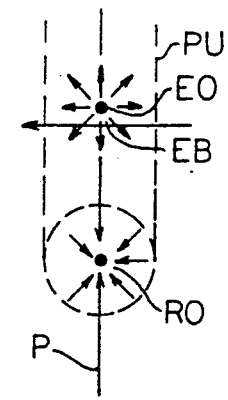
FIG_4b
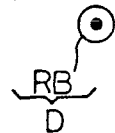
FIG_5a
FIG_5b
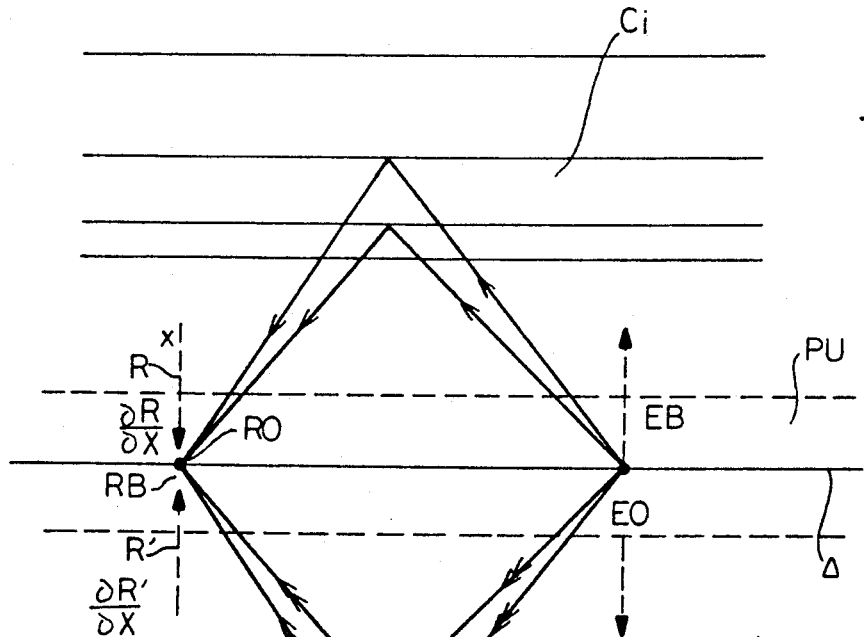
FIG_6

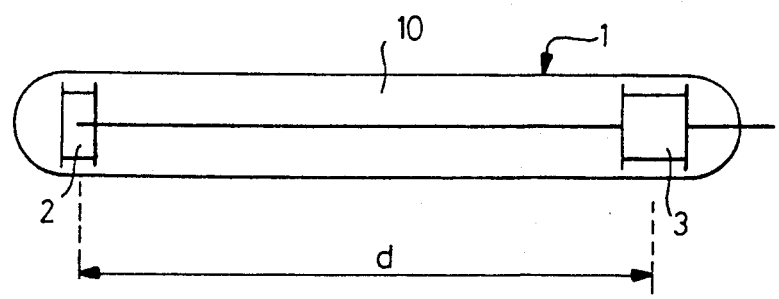
FIG_7a
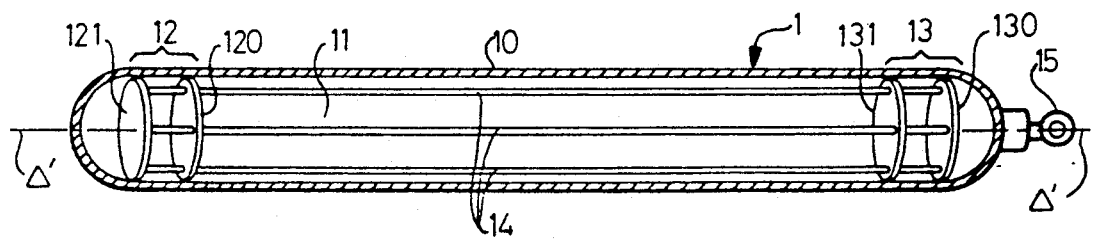
FIG_7b
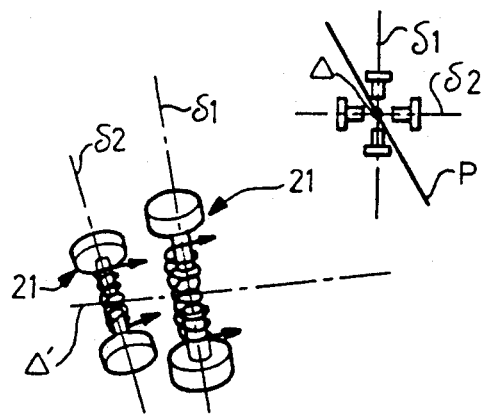
FIG_7c
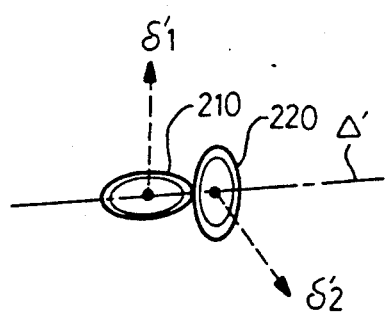
FIG_7d

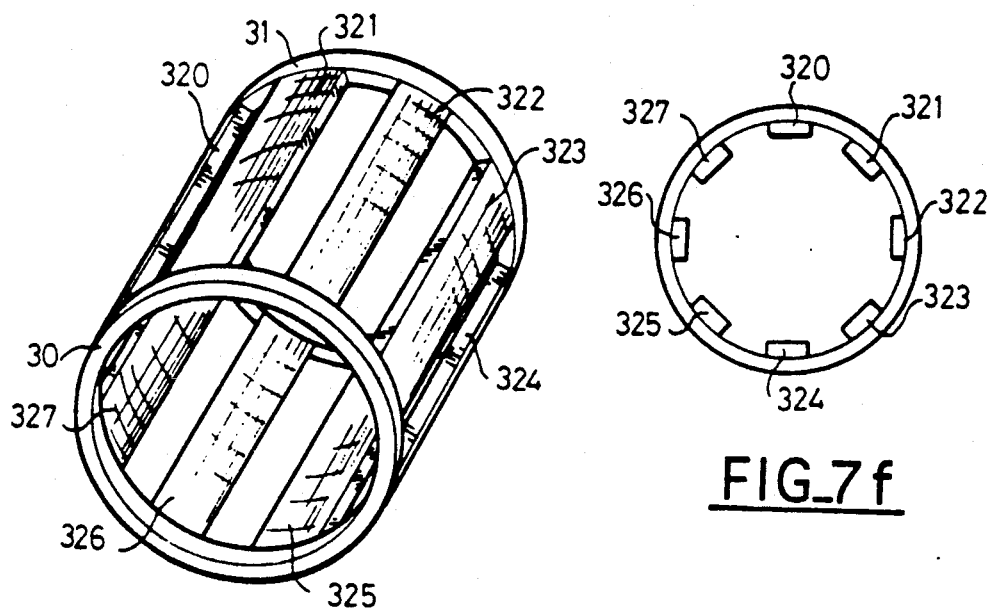
FIG_7e
FIG_7f
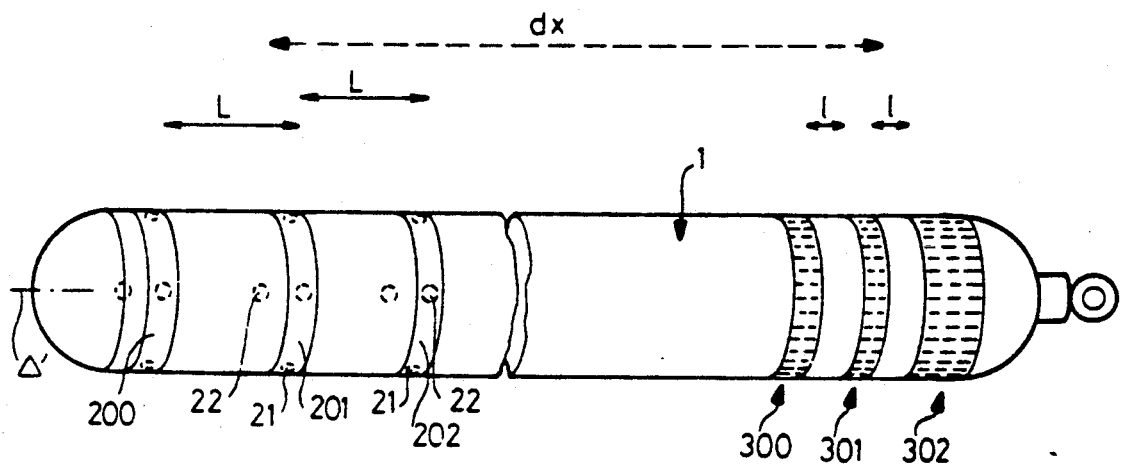
FIG_8

METHOD AND APPARATUS FOR ACQUIRING BOREHOLE SEISMIC DATA IN TWO OPPOSITE DIRECTIONS

BACKGROUND OF THE INVENTION

1. Field of the Invention

The present invention relates to a method and to a system for acquiring borehole seismic data in two opposite directions.

2. Description of Related Art

In a seismic data acquisition borehole or in other boreholes, pressure waves generated from a source may enable information to be acquired relating to the surrounding geological strata.

Attempts have been made to study the geological strata surrounding a borehole by studying the reflection and the refraction of pressure waves generated in the borehole, with the reflection and refraction phenomena acting on the geological strata surrounding the borehole.

These techniques may be of major interest when the borehole is substantially parallel to the surrounding geological strata. In that case, the borehole can be used for studying the above-mentioned geological strata in two opposite directions contained in a longitudinal plane of symmetry of the borehole.

Unfortunately, the above-mentioned study methods encounter the difficulty of discriminating echoes or reflected pressure waves in the two opposite directions when the apparent velocities of these echoes are identical or very close together, as shown in FIGS. 1a and 1b for the echo paths shown by arrows when the angle $\alpha$ is zero or very close to zero. The apparent velocities of the two echoes coming from opposite directions are defined as being inversely proportional to the propagation times between the source that emits the pressure wave and a receiver in the borehole for a corresponding reflection at a point outside the borehole, the receiver being offset at a distance from the source.

When the apparent velocities of echoes relating to two reflecting points situated on either side of the borehole axis are identical, as shown in FIG. 1a, then it is no longer possible to discriminate between the corresponding echoes as received on the basis of their apparent velocities.

SUMMARY OF THE INVENTION

The object of the present invention is to remedy the above-mentioned drawback by implementing a method and apparatus for acquiring borehole seismic data in two opposite directions, in which ambiguity due to identical apparent velocities is removed.

Another object of the present invention is to implement a method and apparatus making it possible, when the borehole is parallel or quasi-parallel to the surrounding geological strata, to determine the different horizons in two opposite directions that are symmetrical about the longitudinal axis of the borehole.

The method of acquiring borehole seismic data from two opposite directions in a borehole includes an improvement comprising: emitting a pressure wave in said borehole; and, at a point in said borehole that is offset relative to the pressure wave emission point, detecting echoes reflected and refracted by the adjacent geological formations in such a manner as to discriminate between pressure waves from opposite directions of the borehole that have been reflected and refracted by said geological formations in a longitudinal plane of symmetry of said borehole. The discrimination is performed on the basis of detecting the sum and a function of the difference of the echo signals coming from said opposite directions.

The apparatus for acquiring borehole seismic data from two opposite directions in a borehole that is parallel or quasi-parallel to the surrounding geological layers includes an improvement comprising: emission means for emitting an omnidirectional and/or bidirectional pressure wave; and bidirectional detection means for detecting echoes reflected and refracted by the adjacent geological formations, the detection means being disposed at a location offset from the emission means, and serving to discriminate between pressure waves from opposite directions of the borehole that have been reflected and refracted by said geological formations in a longitudinal plane of symmetry of said borehole. The discrimination is performed on the basis of detecting the sum and a function of the difference of the echo signals coming from said opposite directions.

The method and the apparatus of the invention are particularly adapted to acquiring borehole seismic data during geophysical prospecting campaigns.

BRIEF DESCRIPTION OF THE DRAWINGS

FIG. 1a is a sectional view of a longitudinal plane of symmetry P of a borehole PU, said plane of symmetry P corresponding to the plane of the paper illustrating how the method of the invention is implemented.

FIG. 1b is a sectional view of plane AA in FIG. 1a.

FIGS. 2a and 2b illustrate a first implementation of the method of the invention corresponding to the views of FIGS. 1a and 1b respectively.

FIGS. 3a and 3b illustrate a second implementation of the method of the invention corresponding to the views of FIGS. 1a and 1b respectively.

FIGS. 4a and 4b illustrate a third implementation of the method of the invention corresponding to the views of FIGS. 1a and 1b respectively.

FIGS. 5a and 5b illustrate a fourth implementation of the method of the invention corresponding to the views of FIGS. 1a and 1b respectively.

FIG. 6 is analogous to FIG. 1a and is a diagram summarizing the particular way the method of the invention is implemented when the difference between the echoes coming from opposite directions is obtained by means of the derivative of the echo signals coming from the opposite directions and whose sum is detected.

FIG. 7a is a diagrammatic view of a tool that is advantageous in implementing the method of the invention.

FIG. 7b is a more detailed view, shown partially in section, of the tool of FIG. 7a.

FIG. 7c shows an advantageous embodiment of a bidirectional receiver for a particularly well-adapted implementation of the tool and the apparatus of the invention as shown in FIG. 7b.

FIG. 7d shows an advantageous embodiment of a bidirectional receiver for a particularly well-adapted implementation of the tool and the apparatus of the invention as shown in FIG. 7b.

FIGS. 7e and 7f show an orthogonal view and a side view, respectively, of an embodiment of an omnidirectional and/or bidirectional source advantageously suitable for being used in the implementation of the tool and of the apparatus as shown in FIGS. 7a and 7b.

FIG. 8 shows a variant embodiment of the tool shown in FIGS. 7a and 7b in which an adjustable and programmable offset may be obtained between the pressure wave emitting source and the bidirectional detection receiver.

DETAILED DESCRIPTION OF THE PREFERRED EMBODIMENTS

The method of the invention for acquiring borehole seismic data from two opposite directions is initially described with reference to FIGS. 1a and 1b.

FIG. 1a is a section through a borehole PU on a longitudinal section plane P showing a non-limiting implementation of the method of the invention.

As shown in FIG. 1a, the method consists of emitting a pressure wave in the borehole PU and, at a point R of the borehole PU which is offset from the pressure wave emission point E, detecting the echoes reflected and refracted by the adjacent geological formations in such a manner as to discriminate between pressure waves reflected and refracted by the geological formations in a longitudinal plane of symmetry of the borehole.

In FIGS. 1a and 1b, the geological formations are represented by strata referenced Ci. As shown in FIGS. 1a and 1b, the pressure wave is emitted from a point E situated on the longitudinal axis $\Delta$ of the borehole, with these waves or reflected echoes being received at a point R on the above-mentioned axis $\Delta$, the reflected and refracted echoes reaching the above-mentioned point R from two opposite directions situated on either side of the longitudinal axis $\Delta$ of the borehole PU.

According to an advantageous characteristic of the method of the invention, the pressure waves reflected and refracted by the geological formations are discriminated, i.e., echoes R are discriminated from the echoes R' by detecting both the sum $R+R'$ and a function of the difference $k(R-R')$ of the echo signals coming from the above-mentioned opposite directions.

In FIG. 1a and in non-limiting manner, the difference function between the echo signals R and R' is written $k(R-R')$, where the coefficient k is either a linear operator or else an operator representing the gradient of the pressure waves or the reflected echoes R and R' relative to the direction orthogonal to the longitudinal axis $\Delta$ of the borehole after composition.

It will naturally be understood that after detecting the sum and the difference of the echo signals, the above-mentioned discrimination can then be performed, for example, by resolving and composing the received signals.

FIG. 1b is a sectional view of plane AA of FIG. 1a. The section of the borehole PU in the plane AA is represented by a solid line circle.

A first implementation of the method of the invention is initially described with reference to FIGS. 2a and 2b.

In FIG. 2a, the emission in the borehole PU is omnidirectional. In FIG. 2a the omnidirectional nature of the emission E is represented by giving the emission point the reference EO, with the emission point EO additionally being surrounded by diverging arrows to symbolize the omnidirectional nature of the emission. Since the emission EO has the above-mentioned omnidirectional nature, detection consists in performing omnidirectional reception RO on said FIG. 2a, with the omnidirectional nature of the reception being additionally symbolized by the set of arrows converging on the point referenced RO.

To perform detection D, the reflected and refracted pressure waves or echoes e.g., RB are received from two directions, with the bidirectional nature of such reception also performed substantially at the point R being represented in FIG. 2a by a vector orthogonal to the plane of the above-mentioned figure, i.e., to the longitudinal plane of symmetry of the borehole PU.

FIG. 2b shows the omnidirectional emission conditions and the omnidirectional and bidirectional reception conditions of FIG. 2a in the situation corresponding to FIG. 1b, the omnidirectional nature of the emission and of the reception being represented in the same manner as in FIG. 2a, with the bidirectional nature of the reception RB then being represented by a vector orthogonal to the longitudinal plane of symmetry of the borehole PU, said plane being referenced P in FIG. 2b and being represented by a continuous line It will be understood that the omnidirectional nature of the emission and the omnidirectional nature of the reception serve respectively to generate pressure waves R and R'. The echoes are received and give rise to the signal $R+R'$ at the reception point R. The bidirectional reception RB at the same time, as performed by differential reception for example, serves to obtain a signal proportional to the difference $R-R'$.

A second implementation of the method of the invention is now described with reference to FIGS. 3a and 3b.

In FIGS. 3a and 3b, emission in the borehole PU is bi-directional, with the emission EB in FIG. 3a being represented by a vector orthogonal to the plane of the above-mentioned figure. Detection D then comprises performing both omnidirectional reception RO of the echoes or reflected and refracted pressure waves symbolized by the set of arrows converging on point RO and bidirectional reception RB thereof.

It may be observed that the above-mentioned bidirectional reception RB iS symbolized by a vector orthogonal to the plane of FIG. 3a. Similarly, the emission and reception conditions of FIG. 3a are shown on FIG. 3b, with bidirectional emission in FIG. 3b being symbolized by a vector orthogonal to the longitudinal plane of symmetry of the borehole PU, said plane being referenced P, and with the bidirectional reception RB being symbolized in the same manner.

The omnidirectional reception RO is also symbolized by a set of arrows converging on point RO.

In a manner analogous to the case shown in FIGS. 2a and 2b, it will easily be understood that since emission is bidirectional in this case, omnidirectional reception RO serves to obtain a signal proportional to the difference between the echo signals, whereas bidirectional reception RB under the same emission conditions naturally serves to obtain a signal proportional to the sum of the same echo signals. The system can be solved to obtain the signals R and R' from the sum and difference signals in similar manner.

An implementation of the method of the invention is described with reference to FIGS. 4a and 4b.

In the above-mentioned figures, emission in the borehole PU is omnidirectional and is referenced EO, with this emission being associated, in addition, with bidirectional emission EB. In this case, detection D consists merely in performing omnidirectional reception RO, with the omnidirectional nature of the emission and of the reception being symbolized respectively by a set of diverging arrows and by a set of converging arrows, whereas the bidirectional nature of the emission is symbolized by a vector orthogonal to the plane of FIG. 4a which represents the longitudinal plane of symmetry P of the borehole PU, the same vector being represented by a vector in the plane of FIG. 4b, which vector is orthogonal to the longitudinal plane of symmetry P of the borehole.

It will be understood that in above-mentioned FIGS. 4a and 4b, for omnidirectional emission EO, omnidirectional reception RO serves to obtain a signal corresponding to the sum of the signals R+R', whereas for bidirectional emission EB, omnidirectional reception RO serves to obtain a signal proportional to the difference between the signals R and R'. The signals R and R' may then be obtained by solving in similar manner to that mentioned above with respect to FIGS. 2a, 2b and 3a, 3b.

A fourth implementation of the method of the invention is described with reference to FIGS. 5a and 5b.

In the above-mentioned figures, emission consists in performing both omnidirectional emission EO and bidirectional emission EB, while detection D consists in performing bidirectional reception RB.

In FIG. 5a, the bidirectional nature of the emission EB and of the reception RB is symbolized by the vector orthogonal to the plane of the above-mentioned figure, i.e. to the longitudinal plane P of symmetry of the borehole PU, which plane is referenced P. The omnidirectional nature of the emission EO is symbolized as before by a set of arrows diverging from this point.

In FIG. 5b, the bidirectional nature of the emission EB and of the reception RB is represented by vectors orthogonal to the longitudinal plane P of symmetry of the borehole PU, which plane is represented by a solid line.

It will naturally be understood that when using omnidirectional emission in FIGS. 5a and 5b, bidirectional reception RB makes it possible with differential type reception to obtain a signal proportional to the difference between the echoes R and R', whereas the bidirectional emission EB in association with bidirectional reception RB serves to obtain a signal proportional to the sum of the echoes R+R'.

A table and a diagram summarizing all of the implementations of the method of the invention are described with reference to FIG. 6.

This summary table relates to an implementation of the method in which bidirectional reception can be performed by means of a differential type bidirectional geophone, with this type of equipment serving to obtain information concerning the pressure gradient $\partial R/\partial x$ or $\partial R'/\partial x$, and omnidirectional reception can be performed, e.g., by means of a hydrophone situated on the longitudinal axis $\Delta$ of the borehole PU, which hydrophone serves in conventional manner to obtain a signal proportional to the sum of the echoes R+R'. The table shown in FIG. 6 gives the form of the sum or the difference signals obtained respectively by omnidirectional reception RO and by bidirectional reception RB in response to omnidirectional type emission EO and in response to bidirectional type emission EB.

It will naturally be understood that by solving the equations in R and R', e.g., after integrating the gradient signals that are obtained, it is possible to obtain the looked-for signals R and R'. This discrimination between the signals R and R' thus makes it possible to separate signals coming from two opposite directions.

In FIG. 6, the longitudinal axis of symmetry $\Delta$ of the borehole PU is shown as being substantially horizontal. This is a non-limiting special case, with the borehole PU being parallel or quasi-parallel, for example, to the surrounding geological strata referenced Ci, as before.

By stating that the axis of the borehole is parallel or quasi-parallel to the surrounding geological strata Ci, it should be understood that the longitudinal axis of the borehole $\Delta$ is inclined relative to the mean orientation of the geological strata by an angle in the range 0° to 20° or 25°. Tests performed in the field have shown that the method of the invention can be implemented for relative inclinations as mentioned above.

It will naturally be understood that when the axis of the borehole is parallel or quasi-parallel to the surrounding geological strata, the longitudinal plane of symmetry of the borehole (i.e., the plane referenced P in the above-mentioned figures), is substantially perpendicular to the adjacent geological strata Ci.

Naturally, omnidirectional and bidirectional emission and reception, respectively referenced E0 & R0 and EB & RB, take place sequentially and in that order or in the opposite order.

Thus, when omnidirectional emission E0 has been performed, detection D performed on the basis both of omnidirectional reception R0 and of bidirectional reception RB serves to obtain the following: for omnidirectional reception R0, a signal representative of echoes proportional to the sum of the pressures R+R' of the pressure waves reflected and refracted in the longitudinal plane of symmetry of the borehole; and for omnidirectional reception RD under identical emission conditions, a signal representative of the difference between the pressure gradients $\partial R/\partial x$ and $\partial R'/\partial x$ in the opposite directions of the pressure waves reflected and refracted in the longitudinal plane of symmetry P of the borehole.

In similar manner, for bidirectional emission EB, detection D performed on the basis both of omnidirectional reception RO and of bidirectional RB obtains the following: for bi-directional reception RB, a signal representative of echoes proportional to the sum of the pressures R+R' of the pressure waves reflected and refracted in the longitudinal plane of symmetry of the borehole; and for omnidirectional reception RD under similar emission conditions, a signal representative of the difference between the pressure gradients $\partial R/\partial x$ and $\partial R'/\partial x$ in the opposite directions of the pressure waves reflected and refracted in the longitudinal plane of symmetry of the borehole.

It will naturally be understood that in the above-mentioned case, the operator k applicable to the echo signal difference R−R' is the derivative operator in the X-direction, and the signals represent the difference between the pressure gradients in the direction in question.

The table showing the signals obtained for omnidirectional emission EO and for bidirectional emission EB in association with omnidirectional reception RO and with bidirectional reception RB is given below:

|    | EO                              | EB                              |
|----|---------------------------------|---------------------------------|
| RO | R + R'                          | $\partial R/\partial x - R\partial'/\partial x$ |
| RB | $\partial R/\partial x - \partial R'/\partial x$ | R + R'                          |

A more detailed description of apparatus for acquiring borehole seismic data in two opposite directions down a borehole is given with reference to FIGS. 7a and 7b.

In FIG. 7a, apparatus of the present invention for acquiring seismic data in two opposite directions in a borehole parallel or quasi-parallel to the surrounding geological strata comprises an acquisition tool 1 including emission means 3 for emitting an omnidirectional and/or a bidirectional pressure wave. The tool 1 further includes bidirectional detection means D, said means being referenced 2 and serving to detect echoes reflected and refracted by the adjacent geological formations in such a manner as to discriminate between the pressure waves reflected and refracted by the geological formations in a longitudinal plane of symmetry of the borehole PU. The discrimination is performed by detecting the sum and the difference of echo signals coming from opposite directions in the manner described above with reference to the method of the invention.

According to an advantageous characteristic of the apparatus of the invention, the emission means may be constituted by a pulse source such as a piezoelectric vibration generator or a magnetostrictive generator, or even a spark generator.

The emission means may also be constituted by a vibration generator source as described in detail below.

In FIG. 7a, the emission means 3 are shown as being separated from the reception means 2 by an offset distance d, with the offset distance enabling echoes to be received as described above.

In a non-limiting embodiment, the bidirectional detection means 2 comprises firstly a hydrophone disposed in the ambient medium of the well which is constituted by mud, for example.

In a non-limiting embodiment, as shown in FIG. 7b, it is preferable for the tool to be constituted by a casing 10 constituted by a watertight plastic sheath for example, said plastic sheath being mounted on a framework made of spacers given respective references 120 and 121 and 130 and 131 which are interconnected by semirigid cables or sling lines 14, each pair of spacers such as 120 and 121 and 131 and 130 being designed to constitute a housing in which the reception means 2 or the emission means 3 can be mounted.

In FIG. 7b, the longitudinal axis of the tool is shown in dashed lines and is referenced Δ'. The sheath 10 is naturally constituted by a watertight sheath with the inside of the sheath 10 being filled with silicone oil, for example, in which the entire apparatus constituted by the emission means 3 and the reception means 2 is immersed.

Naturally, the tool 1 includes a coupling system 15 at one of its ends for coupling to a string of rods or to a cable, for example, thereby enabling the tool 1 to be inserted in and displaced along the borehole PU.

It will naturally be understood that in the embodiment of FIG. 7b, in which the sheath 10 is shown in section so as to show the infrastructure constituted by the spacers and the sling, the hydrophone providing omnidirectional detection for the bidirectional detection means 2 may advantageously be placed substantially on the longitudinal axis Δ' of the tool within the housing constituted by the spacers 120 and 121. Naturally, the sheath 10 is then made of a plastic material which is flexible enough to transmit the vibrations or echo pressure waves R and R' which are themselves transmitted firstly by the mud surrounding the tool 1 in the borehole and secondly by the oil filling the sheath 10 itself.

In addition, in the above-mentioned housing formed by the spacers 120 and 121, the bidirectional detection means 2 may include, for example, a bidirectional geophone, e.g., a differential type geophone including two vibration transducer components disposed orthogonally in a plane orthogonal to the longitudinal axis Δ' of the tool 1. These transducer components are shown in FIG. 7c and are referenced 21 and 22 respectively. These two vibration transducer components whose longitudinal axes of symmetry are referenced ∂1 and ∂2 respectively are designed to be mechanically coupled in operation to the walls of the borehole PU via the flexible sheath 10. It will naturally be understood that regardless of the rotating orientation of the tool 1 relative to its longitudinal axis Δ' when the tool 1 is in the borehole PU, (which orientation is a priori arbitrary when the tool 1 is in the borehole), each transducer 21, 22 serves to detect a corresponding component of the reflected pressure wave or echo situated in the longitudinal plane of symmetry of the borehole PU.

In FIG. 7c, the top righthand portion of the figure is a face view of the transducers 21 and 22, i.e., a view looking along the longitudinal axis Δ', with the longitudinal plane of symmetry P of the borehole PU having arbitrary orientation a priori relative to the above-mentioned transducer.

In similar manner, the bidirectional detection means 2 may include a set of two dipole hydrophones whose axes are perpendicular to each other ad to the axis Δ' of the tool, as shown in FIG. 7d.

In FIG. 7d, the dipole hydrophones are represented by transducer rings 210 and 220 whose respective axes ∂1 and ∂2 are orthogonal to each other and to the longitudinal axis Δ' of the tool.

Naturally, the bidirectional geophone shown in FIG. 7c or the dipole hydrophones shown in FIG. 7d may be made up of components that are directly available commercially, and they are therefore not described in detail.

In order to ensure that the tool 1 is completely self contained, the pulse source and the vibration generator constituting the emission means 3, and the dipole hydrophones and the bidirectional geophone are disposed adjacent to each other in pairs respectively in the housing 13 constituted between the spacers 131 and 130 and in the housing 12 constituted between the spacers 120 and 121 in the embodiment shown in FIG. 7b.

A non-limiting and advantageous embodiment of the omnidirectional and/or bidirectional emission means is described with reference to FIGS. 7e and 7f.

In the above-mentioned figure, an arrangement of vibration sources is shown by way of example, these vibration sources 320 to 327 being disposed between two spacers 30 and 31 in a substantially cylindrical disposition. Thus, of FIG. 7f shows two vibration sources such as 320 and 324 for example which are disposed diametrically opposite to each other, with each vibration source being provided, for example, with a coupling arm (not shown) which is designed to bear via the sheath 10 against the wall of the borehole, said coupling arm being designed to transmit the vibrations emitted by each of the components 320 to 327. Each component constituted by a vibration source and referenced 320 to 327 may be constituted by a source that is normally available commercially and is distributed by Sercel. For this reason this type of source is not described in detail.

In non-limiting and advantageous manner, the sources 320 to 327 may be excited in-phase. These sources have identical emission characteristics and thus because of their symmetrical disposition they are capable of constituting a source or emission means that is omnidirectional.

The embodiment of FIGS. 7e and 7f also serves to make a bidirectional emission source. For this purpose, it suffices to excite two diametrically opposite components, such as components 321 and 324 or 321 and 325, for example. Naturally, in order to be able to ignore the relative orientation in rotation of the emission means shown in FIGS. 7e and 7f the longitudinal axis Δ' of the tool, it is possible to perform sequential emission of pairs of diametrically opposite components such as 320 and 324, or 321 and 325, with sequential emission being continued for all diametrically opposite pairs, and the bidirectional emission that is finally used could then be selected, for example, on a maximum reception criterion, i.e., maximum amplitude in the echo signals received by the reception means 2.

Naturally, the assembly constituted by the diametrically opposite components mounted on the spacers 30 and 31 may be installed in the housing 13 between the spacers 130 and 131, as described above with reference to FIG. 7b.

In order to provide a adaptive tool capable of optimizing the implementation of the method of the invention as a function of conditions relating to the situation and the nature of the geological strata surrounding the borehole, the tool 1 may include, as shown in FIG. 8, a plurality of emission means such as that described with reference to FIGS. 7e and 7f for example, said emission means 300, 301 and 302 in FIG. 8 being spaced apart at a pitch 1 in the longitudinal direction of the tool, which direction is parallel to the axis of symmetry Δ'.

In addition, as shown in said figure, the tool 1 may include a plurality of bidirectional detection means, said means 200, 201 and 202 being installed in housings analogous to the housing 12 and spaced apart at a pitch L in the longitudinal direction of the tool 1, which direction is parallel to the axis of symmetry Δ'.

Naturally, each detection means 200, 201 and 202 may then include transducer components 21 or 22 or 210 and 220 as shown in FIG. 7c or in FIG. 7d. In addition, an omnidirectional hydrophone is provided with each of the bidirectional detection means 200, 201, and 202. It will naturally be understood that the set of emission means 300, 301, 302 and detection means 200, 201, and 202 may be activated selectively to obtain, between the reception means and the emission means, an offset distance dx which is adjustable by user choice as a function of conditions of use.

In one embodiment, the tool i has four emission means such as 300, 301, and 302 in FIG. 8, and a plurality of detection means such as 200, 201, and 202, with the offset distance dx being adjustable between a minimum value of one meter to several tens of meters in steps of 25 cm or multiples of 25 cm.

A method and apparatus for acquiring borehole seismic data have thus been described that are particularly advantageous in that, because they discriminate between opposite directions of the reflected pressure waves or echoes used in accordance with the present invention, different horizons can be determined on either side of the borehole in two opposite directions. This method of working appears to be particularly advantageous with a horizontal borehole for determining horizons that are above and below the borehole PU, as shown in FIG. 6.

It is recalled that the term "horizons" is used in the art in question to designate geological strata that may be physically distinct or otherwise and that are capable of constituting a reflector for pressure waves.

I claim:

1. A method of acquiring borehole seismic data in two opposite directions in a borehole, the method comprising the steps of:

emitting (E) a pressure wave (R, R') in said borehole; and detecting echoes, at a point in said borehole that is offset relative to the pressure wave emission point (E), reflected and refracted by the adjacent geological formations in such a manner as to discriminate between pressure waves from the two opposite directions that have been reflected and refracted by said geological formations in a longitudinal plane of symmetry of said borehole, said discrimination being performed on the basis of detecting the sum (R+R') and a function of the difference k(R−R') of the echo signals coming from said opposite directions.

2. A method according to claim 1, wherein:
said emitting is omnidirectional; and
said detecting comprises performing omnidirectional reception and bidirectional reception of the echoes or reflected and refracted pressure waves, the two directions of bidirectional reception defining a plane orthogonal to the longitudinal plane of symmetry of said borehole.

3. A method according to claim 1, wherein:
said emitting is bidirectional; and
said detecting comprises performing omnidirectional reception and bidirectional reception of the echoes or reflected and refracted pressure waves, the two directions of said emission and of said bidirectional reception being respectively contained in a plane orthogonal to said longitudinal plane of symmetry of said borehole.

4. A method according to claim 1, wherein:
said emitting is omnidirectional and bidirectional; and
said detecting comprises performing omnidirectional reception, the two directions of said bidirectional emission defining a plane orthogonal to said longitudinal plane of symmetry of the borehole.

5. A method according to claim 1, wherein:
said emitting is bidirectional and omnidirectional; and
said detecting comprises performing bidirectional reception, the two directions of said bidirectional emission and of said bidirectional reception being respectively contained in a plane orthogonal to said longitudinal plane of symmetry of said borehole.

6. A method according to any preceding claim, wherein:
said borehole is parallel or quasi-parallel to said surrounding geological strata; and
said longitudinal plane of symmetry of the borehole is substantially perpendicular to said strata.

7. A method according to any one of claims 2 to 5, wherein said omnidirectional and bidirectional emission or reception are both performed in that order or in the opposite order.

8. A method according to any one of claims 1 to 5, wherein said detecting is performed on the basis of said omnidirectional and bidirectional reception, said omnidirectional reception serving with omnidirectional emission to obtain a signal representative of echoes proportional to the sum of the pressures (R+R') of the pressure waves reflected and refracted in said longitudinal plane of symmetry of the borehole, said bidirectional reception serving to obtain a signal representative of the difference between the pressure gradients ($\partial R/\partial x$ and $\partial R'/\partial x$) in said directions of the pressure waves reflected or refracted in said longitudinal plane of symmetry of the borehole.

9. A method according to any one of preceding claims 1 to 5, wherein said detecting is performed on the basis of said omnidirectional and bidirectional reception, said bidirectional reception in association with bidirectional emission serving to obtain a signal representative of echoes proportional to the sum of the pressures ($R+R'$) of the pressure waves reflected and refracted in said longitudinal plane of symmetry of the borehole, said bidirectional reception serving to obtain a signal representative of the difference between the pressure gradients ($\partial R/\partial x$ and $\partial R/\partial x$) in said direction of the pressure waves reflected and refracted in said longitudinal plane of symmetry of the borehole.

10. Apparatus for acquiring borehole seismic data in two opposite directions in a borehole parallel or quasi-parallel to surrounding geological strata, comprising:
emission means for emitting an omnidirectional and-/or a bidirectional pressure wave; and
bidirectional detection means for detecting echoes reflected and refracted by the adjacent geological formations, the detection means being disposed at an offset from the emission means, and serving to discriminate between pressure waves from the two opposite directions that have been reflected and refracted by said geological formations in a longitudinal plane of symmetry of said borehole, the discrimination being performed on the basis of detecting the sum and the difference of the echo signals coming from said opposite directions.

11. Apparatus according to claim 10, wherein said emission means are constituted by a pulse source.

12. Apparatus according to claim 10 or 11, wherein said emission means are constituted by a vibration generating source.

13. Apparatus according to claims 10 or 11, wherein said bidirectional detection means comprise a hydrophone disposed in the ambient medium of the borehole constituted by mud.

14. Apparatus according to claims 10 or 11, wherein said bidirectional detection means comprise either a set of two dipole hydrophones whose axes are mutually perpendicular and perpendicular to the axis of the apparatus, or bidirectional geophone comprising two vibration transducer components disposed orthogonally in a plane that is orthogonal to the longitudinal axis of the apparatus, the two vibration transducer components being designed to be mechanically coupled in operation with the walls of the borehole.

15. Apparatus according to claim 12, wherein the pulse source and vibration generator are disposed close to the dipole hydrophones and bidirectional geophone.

16. Apparatus according to claims 10 or 11, further comprising a plurality of emission means and bidirectional detection means, said means being capable of being activated selectively to obtain an offset distance between the reception means and the emission means that is adjustable depending on user choice.

17. A method according to claim 6, wherein said omnidirectional and bidirectional emission or reception are both performed in that order or in the opposite order.

18. A method according to claim 6, wherein said detecting is performed on the basis of said omnidirectional and bidirectional reception, said omnidirectional reception serving with omnidirectional emission to obtain a signal representative of echoes proportional to the sum of the pressures ($R+R'$) of the pressure waves reflected and refracted in said longitudinal plane of symmetry of the borehole, said bidirectional reception serving to obtain a signal representative of the difference between the pressure gradients ($\partial R/\partial x$ and $\partial R/\partial x$) in said directions of the pressure waves reflected or refracted in said longitudinal plane of symmetry of the borehole.

19. A method according to claim 6, wherein said detecting is performed on the basis of said omnidirectional and bidirectional reception, said omnidirectional reception serving with omnidirectional emission to obtain a signal representative of echoes proportional to the sum of the pressures ($R+R'$) of the pressure waves reflected and refracted in said longitudinal plane of symmetry of the borehole, said bidirectional reception serving to obtain a signal representative of the difference between the pressure gradients ($\partial R/\partial x$ and $\partial R/\partial x$) in said directions of the pressure waves reflected or refracted in said longitudinal plane of symmetry of the borehole.

20. A method according to claim 6, wherein said detecting is performed on the basis of said omnidirectional and bidirectional reception, said bidirectional reception in association with bidirectional emission serving to obtain a signal representative of echoes proportional to the sum of the pressures ($R+R'$) of the pressure waves reflected and refracted in said longitudinal plane of symmetry of the borehole, said bidirectional reception serving to obtain a signal representative of the difference between the pressure gradients ($\partial R/\partial x$ and $\partial R/\partial x$) in said direction of the pressure waves reflected and refracted in said longitudinal plane of symmetry of the borehole.

21. A method according to claim 7, wherein said detecting is performed on the basis of said omnidirectional and bidirectional reception, said bidirectional reception in association with bidirectional emission serving to obtain a signal representative of echoes proportional to the sum of the pressures ($R+R'$) of the pressure waves reflected and refracted in said longitudinal plane of symmetry of the borehole, said bidirectional reception serving to obtain a signal representative of the difference between the pressure gradients ($\partial R/\partial x$ and $\partial R/\partial x$) in said direction of the pressure waves reflected and refracted in said longitudinal plane of symmetry of the borehole.

22. Apparatus according to claim 12, wherein said bidirectional detection means comprise a hydrophone disposed in the ambient medium of the borehole constituted by mud.

23. Apparatus according to claim 12, wherein said bidirectional detection means comprise either a set of two dipole hydrophones whose axes are mutually perpendicular and perpendicular to the axis of the apparatus, or a bidirectional geophone, comprising two vibration transducer components disposed orthogonally in a plane that is orthogonal to the longitudinal axis of the apparatus, the two vibration transducer components being designed to be mechanically coupled in operation with walls of the borehole.

24. Apparatus according to claim 13, wherein said bidirectional detection means comprise either a set of two dipole hydrophones whose axes are mutually perpendicular and perpendicular to the axis of the apparatus, or a bidirectional geophone, comprising two vibration transducer components disposed orthogonally in a plane that is orthogonal to the longitudinal axis of the apparatus, the two vibration transducer components being designed to be mechanically coupled in operation with walls of the borehole.

25. Apparatus according to claim 14, wherein the pulse source and vibration generator are disposed close to the dipole hydrophones and bidirectional geophone.

26. Apparatus according to claim 12, further comprising a plurality of emission means and bidirectional detection means, said means being capable of being activated selectively to obtain an offset distance between the reception means and the emission means that is adjustable depending on user choice.

27. Apparatus according to claim 13, further comprising a plurality of emission means and bidirectional detection means, said means being capable of being activated selectively to obtain an offset distance between the reception means and the emission means that is adjustable depending on user choice.

28. Apparatus according to claim 14, further comprising a plurality of emission means and bidirectional detection means, said means being capable of being activated selectively to obtain an offset distance between the reception means and the emission means that is adjustable depending on user choice.

29. Apparatus according to claim 15, further comprising a plurality of emission means and bidirectional detection means, said means being capable of being activated selectively to obtain an offset distance between the reception means and the emission means that is adjustable depending on user choice.

30. A method of acquiring borehole seismic data in first and second opposite directions in a borehole surrounded by geological formations, said first and second directions being contained in a longitudinal plane of symmetry of said borehole passing through a longitudinal axis of said borehole and being symmetrical about said axis, said axis being substantially parallel to said geological formations, said method comprising the steps of:
   detecting a signal representative of echoes proportional to the sum of the pressure waves reflected and refracted in said first direction and the pressure waves reflected and refracted in said second direction;
   detecting a signal representative of the difference between pressure gradients of the pressure waves reflected and refracted in said first direction and the pressure waves reflected and refracted in said second direction; and
   discriminating between said pressure waves reflected and refracted in said first direction and said pressure waves reflected and refracted in said second direction based upon the detecting of said signals representative of said sum and said difference.

31. A method according to claim 30, wherein said detecting a signal proportional to the sum and said detecting a signal representative of the difference between pressure gradients comprises:
   omnidirectional emission of a pressure wave from a first point in said borehole;
   omnidirectional reception at a second point, offset from said first point, of the pressure waves reflected and refracted in said first and second directions so as to detect a signal representative of echoes proportional to the sum of the pressure waves reflected and refracted in said first direction and the pressure waves reflected and refracted in said second direction; and
   bidirectional reception at said second point of the pressure waves reflected and refracted in said first and second directions so as to detect a signal representative of the difference between the pressure gradients of the pressure waves reflected and refracted in said first direction and the pressure waves reflected and refracted in said second direction.

32. A method according to claim 30, wherein said detecting a signal proportional to the sum and said detecting a signal representative of the difference between pressure gradients comprises:
   bidirectional emission from a first point of a pressure wave;
   bidirectional reception at said second point of the pressure waves reflected and refracted in said first and second directions so as to detect a signal representative of echoes proportional to the sum of the pressure waves reflected and refracted in said first direction and the pressure waves reflected and refracted in said second direction; and
   omnidirectional reception at a second point of the pressure waves reflected and refracted in said first and second directions so as to detect a signal representative of the difference between the pressure gradients of the pressure waves reflected and refracted in said first direction and the pressure waves reflected and refracted in said second direction.

33. A method according to claim 30, wherein said detecting a signal proportional to the sum and said detecting a signal representative of the difference between pressure gradients comprises:
   omnidirectional emission from a first point of a pressure wave;
   bidirectional emission from a first point of a pressure wave; and
   omnidirectional reception at a second point of the pressure waves reflected and refracted in said first and second directions so as to detect, respectively, both a signal representative of echoes proportional to the sum of and a signal representative of the difference between the pressure gradients of the pressure waves reflected and refracted in said first direction and the pressure waves reflected and refracted in said second direction.

34. A method according to claim 30, wherein said detecting a signal proportional to the sum and said detecting a signal representative of the difference between pressure gradients comprises:
   bidirectional emission from a first point of a pressure wave;
   omnidirectional emission from a first point of a pressure wave;
   bidirectional reception at a second point of the pressure waves reflected and refracted in said first and second directions so as to detect, respectively, both a signal representative of echoes proportional to the sum of and a signal representative of the difference between the pressure gradients of the pressure waves reflected and refracted in said first direction and the pressure waves reflected and refracted in said second direction.

35. Apparatus for acquiring borehole seismic data in a first and a second opposite directions in a borehole surrounded by geological formations, said first and second directions being contained in a longitudinal plane of symmetry of said borehole passing through a longitudinal axis of said borehole and being symmetrical about said axis, said axis being substantially parallel to said geological formations, said apparatus comprising:

emission means for emitting a bidirectional and an omnidirectional pressure wave;

bidirectional reception means, offset from said emission means, for receiving pressure waves reflected and refracted in said first and second directions, so as to carry out, respectively, detection of a signal representative of echoes proportional to the sum of the pressure waves reflected and refracted in said first direction and the pressure waves reflected and refracted in said second direction and detection of a signal representative of the difference between pressure gradients of the pressure waves reflected and refracted in said first direction and the pressure waves reflected and refracted in said second direction; and discrimination means for discriminating between said pressure waves reflected and refracted in said first direction and said pressure waves reflected and refracted in said second direction, based upon the detection of said signals representative of said sum and said difference.

36. Apparatus according to claim 35, wherein said emission means comprises a pulse source.

37. Apparatus according to claim 35, wherein said emission means comprises a vibration generating source.

38. Apparatus according to claim 35, wherein said bidirectional detection means comprises a hydrophone disposed in the ambient medium of the borehole constituted by mud.

39. Apparatus according to claim 35, wherein said bidirectional detection means comprises a set of two dipole hydrophones whose axes are mutually perpendicular and perpendicular to the axis of the apparatus, or a bidirectional geophone comprising two vibration transducer components disposed orthogonally in a plane that is orthogonal to the longitudinal axis of the apparatus, the two vibration transducer components being designed to be mechanically coupled in operation with the walls of the borehole.

40. Apparatus according to claim 37 or 39, wherein the pulse source and vibration generator are disposed close to the dipole hydrophones and bidirectional geophone.

41. Apparatus according to claim 35, wherein said apparatus further comprises a plurality of emission means and bidirectional detection means, said means being capable of being activated selectively to obtain an offset distance between the reception means and the emission means that is adjustable depending on user choice.

* * * * *